Patented Mar. 11, 1941

2,234,215

UNITED STATES PATENT OFFICE 2,234,215

PLASTIC POLYMERIC DERIVATIVES OF CHLOROPRENE AND PROCESS OF PRODUCING THE SAME

Mortimer A. Youker, Gordon Heights, Del., assignor to E. I. du Pont de Nemours & Company, Wilmington, Del., a corporation of Delaware No Drawing. Application March 28, 1939, Serial No. 264,581

13 Claims. (Cl. 260—89)

This invention relates to a new method for making plastic polymers of chloro-2-butadiene-1,3 (hereinafter, for convenience, called chloroprene) and more particularly to a method for plasticizing the chloroprene polymers made in the presence of sulfur.

Chloroprene polymerized in the massive state in the presence of sulfur and a substituted thiuram disulfide such as tetramethyl thiuram disulfide, as disclosed and claimed by Carothers and Kirby in U. S. Patent No. 1,950,439, gives a high yield of plastic product but the reaction is hard to carry out on a large scale because of the difficulty of removing the heat of reaction from the viscous or gelatinous reaction mass. When an attempt is made to avoid this difficulty by carrying out the reaction in an emulsion, it is found that the thiuram disulfide prevents polymerization, and if the thiuram disulfide is omitted, that is, if the polymerization is carried out in emulsion in the presence of sulfur only (as described in a copending application of Collins, Serial No. 204,305, filed April 26, 1938,) then the product obtained is not plastic. It is disclosed in a copending application of Youker, Serial No. 176,821, filed November 27, 1937, that elastic polymers of chloroprene may be rendered plastic by treating them with certain substituted hydrazines. Although this method is of general application, it has the disadvantages that the hydrazines must be thoroughly removed after the polymer has been plasticized. Certain types of non-plastic chloroprene polymers, such as that produced in Example 7 of a copending application of Starkweather and Collins, Serial No. 156,518, filed July 30, 1937, (this particular example is not an embodiment of the invention described in the application in which it appears) may be plasticized to some extent by prolonged milling but such a process is generally inefficient and somewhat costly.

It is an object of the present invention to provide a new and improved method for producing plastic polymers of chloroprene. A more specific object is to provide a method for imparting plasticity to polymers of chloroprene obtainable by polymerizing chloroprene in the presence of sulfur. A further object is to plasticize such polymers of chloroprene to a high degree without extensive milling. A still further object is to plasticize chloroprene polymers without extensive milling and without the introduction of substances which must afterward be removed. A more general object is the provision of a process for producing plastic polymers of chloroprene which permits of easier handling and shipping of chloroprene polymers and which renders it practical for users to have available for use, chloroprene polymers having a wider variety of degrees of plasticity. Another object of the invention is to prepare polymers of chloroprene which are truly fluid, that is, which are truly capable of flowing under the influence of any unbalanced pressure however small  Other objects will appear hereinafter.

These objects are accomplished by incorporating into the polymers of chloroprene obtainable by polymerizing chloroprene in the presence of sulfur, one or more compounds of the general formula $R\!-\!S\!-\!R_1$, where R is an alkyl, aryl, thiazyl, thiocarbamyl, xanthogenyl, thioxanthogenyl, aromatic acyl, or aromatic thioacyl group and $R_1$ is hydrogen, a base-forming radical, or a group represented by $-\!S_n\!-\!R$, in which $n$ is a whole number less than four and R is one of the groups represented by R above and then subjecting the polymers to conditions adapted to develop plastic properties. Thus, the invention includes the development, promotion, and/or acceleration of the plasticizing action of these compounds by aging, heating, and/or milling the polymer into which they have been incorporated and/or by adding basic substances, for example, amines which give bases with dissociation constants greater than about $10^{-6}$. This application is a continuation in part of applicant's application Serial No. 204,362, filed April 26, 1938.

This process applied to chloroprene polymers prepared in the presence of sulfur not only plasticizes those that are elastic and substantially non-plastic but also increases the plasticity of the more plastic polymers of this class. One method for the preparation of chloroprene polymers containing sulfur and suitable for plasticization according to the present invention is described in Example 1 of the U. S. Patent No. 1,950,439 of Carothers and Kirby.

A more convenient method for preparing such polymers is described in the copending application of Collins already identified. This method comprises dispersing chloroprene in an aqueous dispersing medium and polymerizing the chloroprene while so dispersed in the presence of sulfur. Preferably the sulfur is dissolved in the chloroprene prior to dispersion of the chloroprene. The dispersion medium may be acid, neutral, or alkaline but is preferably neither strongly acid nor strongly alkaline. The latices described in Examples 1 to 37 and 43 to 49 of the Collins application, give when coagulated, polymers which are substantially non-plastic, while plastic products are obtained directly in the case of Examples 38 to 42. The method of polymerizing in emulsion is particularly convenient since it can be more rapidly carried out and more readily controlled when used on a larger scale than can the method specifically disclosed in U. S. Patent No. 1,950,439. Therefore, a preferred form of the present invention involves treatment of polymers prepared according to the method disclosed in the Collins application.

The varied embodiments of this invention are illustrated in the following examples. It should be understood, however, that these examples are intended to be illustrative only and are not intended to limit the scope of the invention. The term "parts," whenever hereinafter used, signifies parts by weight.

In these examples and throughout this application, whenever the term "plasticity number" is used, it refers to the thickness in thousandths of an inch of a sample 2.5 cc. in volume in the form of a cylinder ⅝ inch in diameter which has been heated to 80° C. for 15 minutes and then kept under a weight of 5 kilograms for 3 minutes at 80° C. Thus, the lower the "plasticity number," the greater is the plasticity. The term "regain" or "recovery," whenever hereinafter used, refers to the increase in thickness of the compressed sample which takes place in one minute on removing the compressing weight and allowing the sample to return to room temperature.

The first eleven examples are given in Table I. The latices used in these examples were prepared as described in the copending application of Collins, referred to above, (the number of the corresponding example in the Collins case is given in parenthesis after the number in the table) i. e., 100 parts of chloroprene in which the quantities of impurities did not substantially exceed those given in the discussion below and containing the indicated quantities of dissolved sulfur and other agents was emulsified by gradual addition, with the rapid mechanical agitation secured by repeated passage thru a centrifugal pump, to the indicated quantity of an aqueous solution containing the indicated emulsifying and other agents. Further variations in the process are given in foot-notes to the table. The dispersion was then maintained, in a vessel which could be externally heated or cooled, at the indicated temperature until the percentage of the chloroprene indicated in the table had been polymerized. The course of the polymerization was followed by determining the density of the dispersion, which is approximately a linear function of the proportion of chloroprene which has polymerized. The density corresponding to any given yield of polymer may, accordingly, be calculated from the densities of the starting materials and of the polymer or may be read from an experimentally determined graph. Thus, the polymerization was continued until the density corresponding to the yield given in the table was reached. The approximate times required to reach this stage of polymerization are indicated but since they vary somewhat, even when conditions are closely duplicated, it will be found more accurate to end the operation when the proper density has been reached rather than after a given time.

Further polymerization of this latex was then arrested by the addition of 1 part of phenyl-beta-naphthylamine and 1 part of tetramethyl thiuram disulfide dispersed in 10 additional parts of the emulsifying solution with the aid of 8 parts of benzene. The latex was then coagulated by addition of saturated sodium chloride solution with the further addition of ethyl or butyl alcohol in Example 11 where coagulation was difficult with salt alone, according to the method disclosed by Calcott and Youker in their application Serial No. 181,602, filed December 24, 1937. The resulting coagulated polymer was then plasticized and at the same time washed and dried by working it first under running water at 50° C. on a mill with corrugated rolls for from 20 to 30 minutes and then on a smooth mill at 50° C. for an additional 20 or 30 minutes with the addition of 0.5 part of phenyl-beta-naphthylamine and 0.5 part of tetramethyl thiuram disulfide until it had reached constant weight. The plasticity numbers and regains of the resulting plasticized polymers are given in the table. The table also gives the tensile strength obtained after compounding these plastic polymers with 5 parts of wood rosin, 5 parts of zinc oxide and 10 parts of light calcined magnesia per 100 parts of plastic polymer and curing in a press for 10 minutes at 151° C.

Table I

| Example No. | Emulsifying agent | Amount | Water | Sulfur | | Temp. | Time | Yield | Plasticity number and regain | Tensile strength |
|---|---|---|---|---|---|---|---|---|---|---|
| | | | | | | °C. | Min. | Percent | | Lbs./sq. in. |
| 1(14) | Na oleate | 3.0 | 300 | 1.0 | | 40 | 180 | 84 | 92-0 | 3450 |
| 2(16) | Na stearate | 4.5 | 300 | 1.0 | | 40 | 90 | 85 | 85-1 | 3425 |
| 3(17) | Na naphthenate | 3.0 | 300 | 1.0 | | 40 | 2880 | 66 | 100-4 | 2925 |
| 4(21) | Na hydroabietate (0.25 part NaOH) | 4.0 | 300 | 0.5 $Bz_2O_2$ | 0.05 | 40 | 130 | 90 | 93-4 | 4275 |
| 5(23) | Na hydroabietate (0.13 part NaOH) | 4.0 | 300 | 1.0 $Na_2S_2O_3$[1] | 0.05 | 40 | 60 | 87 | 103-7 | 3800 |
| 6(25) | Na abietate (0.25 part NaOH) | 4.0 | 233 | 0.75 $(NH_4)_2S_2O_3$[1] | 0.5 | 40 | 120 | 90 | 74-3 | 4475 |
| 7(26) | Na isopropylnaphthalene sulfonate | 3.0 | 300 | 1.0 | | 40 | 80 | 90 | 147-12 | 3200 |
| 8(30) | Na "Lorol"[2] sulfate | 3.0 | 300 | 1.0 | | 40 | 105 | 86 | 142-16 | 3800 |
| 9(35) | Na salt of sulfated oleyl acetate | 8.0 | 400 | 1.0 $CS_2$ | 10.0 | 40 | 30 | 90 | 124-16 | 3775 |
| 10(37) | Na salt of sulfated oleyl acetate | 4.0 | 400 | 2.0 $CS_2$ | 10.0 | 40 | 30 | 84 | 105-5 | 2475 |
| 11(46) | C-cetyl betaine | 3.0 | 300 | 1.0 | | 40 | 270 | 73 | 130-8 | 4350 |

[1] These were dissolved in the aqueous phase.
[2] "Lorol" is a mixture of straight chain aliphatic alcohols, with an average chain length of about 13 carbon atoms, made from cocoanut oil.

The nature and quality of the impurities present in the chloroprene usually have a substantial effect upon the properties of the final product and, in general, its quality improves as the amount of these impurities is decreased. In carrying out the present invention, it is therefore preferable to employ a chloroprene of the highest purity, i. e., one which is substantially free of the impurities mentioned hereinafter, although chloroprene containing up to 0.5% of monovinylacetylene, up to 0.2% of acetaldehyde, and up to 5.0% of dichloro-1,3-butene-2 may be used with good results. Divinylacetylene should be substantially absent. When the emulsifying solutions sensitive to acids are used, and the latices are to be stored for considerable periods, the total concentration of dichlorobutene and other impurities yielding acids on hydrolysis is preferably less than 0.5%. On the other hand, in certain instances, impurities have favorable effects on some properties and may advantageously be added or allowed to remain in these particular cases. For example, divinylacetylene, although undesirable from many points of view, has been observed to improve solvent resistance in certain cases.

Any of the forms of sulfur which are soluble in chloroprene may be used. Ordinarily, the sulfur is dissolved directly in chloroprene before emulsification. Particularly when high proportions of sulfur are desired it is advantageous to dissolve the sulfur in a solvent such as carbon disulfide or a highly chlorinated naphthalene. The sulfur may also be added to the water phase in the form of an aqueous dispersion provided conditions are such that the sulfur dissolves in the chloroprene phase in substantial amount before polymerization. In short, any method of adding the sulfur may be used which produces this latter result. The proportion of sulfur used is ordinarily from about 0.25% based on the chloroprene, up to the maximum amount soluble in the chloroprene phase at the temperature of polymerization. Increasing the proportion of sulfur within these limits increases the extent to which the resulting polymers may be plasticized.

Further variations in the process comprise polymerization in the presence of both sulfur and one or more modifying agents, (sulfur dioxide, hydrogen sulfide, unpolymerizable acid stable organic compounds which form monomolecular addition products with chloro-2-butadiene-1,3, under mild conditions of reaction, etc.) such as are disclosed in Starkweather's U. S. application 69,739, filed March 19, 1936; Starkweather and Collins U. S. applications 69,737 and 156,518, filed March 19, 1936, and July 30, 1937, respectively, (when these modifying agents are used with sulfur, the polymer isolated from the latex is, in general, soluble and rather plastic without additional treatment, although it may be made more plastic by subjecting it to the plasticizing treatment disclosed herein) and polymerization in the presence of sulfur varied in any of the ways disclosed in U. S. Patent No. 1,967,861 with reference to emulsion polymerization in general, including polymerization in the presence of inhibitors (see U. S. Patent No. 1,950,438) and polymerization in the presence of solvents, oils, softeners, film-forming materials, and polymerizable compounds (see U. S. Patents Nos. 1,967,860; 2,029,410; 2,066,329; 2,066,330; and 2,066,331). Altho certain of the compounds included by the above general formula, such as the thiocarbamates and thiuram disulfides, greatly inhibit the polymerization of chloroprene in emulsion in the presence of sulfur, the remainder of the compounds, in general, have little or no inhibiting effect and accordingly they may in many cases be added advantageously before or during the polymerization. Thus, when chloroprene is polymerized in the presence of sulfur and of compounds such as the mercaptans, the dixanthogens, the bis-thioxanthogens and the aromatic acyl polysulfides, a plastic product results directly. The present invention is limited, however, to the addition of these agents to the chloroprene polymer.

Addition of mercaptans before or during polymerization is claimed in the copending application of Collins, referred to above.

Any emulsifying agent may be used to assist in dispersing the chloroprene but naturally those giving fine and permanent dispersions are preferred. The medium in which the chloroprene is polymerized may be either alkaline, neutral, or acid. Of course, it will be necessary to choose an emulsifying agent which is effective in the medium in which the polymerization is to be carried out. Preferred emulsifying agents from the points of view of both economy and efficiency are the water soluble salts of carboxylic acids containing long hydrocarbon chains or polycyclic systems for example sodium oleate and especially the derivatives of rosin such as sodium abietate. The amount of emulsifying agent used will, of course, depend upon the effectiveness of the particular agent, the concentration of the emulsion and the degree of stability desired. In general, the emulsifying medium used will contain from about 0.2% to 6% of emulsifying agent based on the weight of the emulsifying medium, although still lower or higher amounts may also be used.

It is often advantageous to carry out the polymerization in a medium of different hydrogen ion concentration from that resulting from dissolving the emulsifying and other agents in the water. In addition to its effect on modifying agents and stability, the hydrogen ion concentration of the medium also has in many cases an ultimate effect upon the plasticity and other properties of the products of the present invention. The present invention in its broadest aspects is not, however, limited as to the hydrogen ion concentration of the dispersions. If desired, the polymerization in emulsion may be accelerated in any of a variety of ways, such as by increasing the reaction temperature, or the concentration of the emulsifying agent, or by adjusting the hydrogen ion concentration, or by the choice of an emulsifying agent, or by the use of catalysts, such as soluble compounds containing the peroxide nucleus.

A high concentration of chloroprene in the starting dispersions usually makes it difficult to maintain the desired temperature and low concentrations require larger reaction vessels and more coagulant and accordingly the preferred range for the concentration of chloroprene in the emulsions is 20% to 65% although both higher and lower concentrations may be used. The chloroprene may be dispersed in the emulsifying medium in any desired manner but is is preferable to so emulsify it as to form very fine particles. Polymerization may be effected at temperatures ranging from 0° C. to 100° C. and above but the preferred range of polymerization temperatures is about 20° C. to about 80° C. It has been observed that increasing the temperature in addition to speeding up the polymerization also reduces the tendency of both the cured and the uncured polymer to become stiff and hard when kept for long periods at low temperatures. The mixing of the various constituents as well as the emulsification and polymerization described above may also be carried out continuously, according to the procedure described in the copending application of Starkweather and Collins, Serial No. 156,518, filed July 30, 1937. In fact, by following the procedure described in a copending application of Walker, Serial No. 154,212, filed July 17, 1937, the whole procedure, beginning with the mixing prior to emulsification and continuing thru the further steps described herein including coagulation, washing and drying of the polymer, may be conducted continuously.

The products produced by the process illustrated in the above examples will naturally vary considerably in their characteristics, depending upon the particular conditions employed. The extent of polymerization (proportion of the chloroprene consumed) has been found to be one of the factors which affects the behavior of the polymer when plasticized by the process disclosed in this application. Thus, a lower yield is usually associated with greater plasticity but somewhat inferior strength. When the polymerization has proceeded to the extent found by preliminary experiments to correspond to the properties desired, it may be stopped by the addition of an antioxidant, such as phenyl-beta-naphthylamine or by the addition of one of the compounds disclosed for that purpose in Walker U. S. application, Serial No. 154,212, filed July 17, 1937, for example, a thiuram disulfide such as tetramethyl thiuram disulfide. In addition to serving to arrest polymerization, both the antioxidant and the compounds disclosed by Walker also serve other purposes, for example, protecting the polymer against the effect of oxygen in the case of the former and, in the case of the latter, assisting to plasticize the polymer according to the process described herein. Antioxidants which are effective for the protection of natural rubber against the action of oxygen also function in the case of the polymers of the present invention. In addition to phenyl-beta-naphthylamine, the following have been found particularly useful:

N-acetyl-N-phenyl-p-phenylene-diamine
Di-(p-methoxy-phenyl)-amine
Di-phenyl-p-phenylene-diamine
p-Tolyl-sulfonyl-amino-phenyl-p-tolyl-amine
p-Ethoxy-phenyl-beta-naphthylamine
4:4'-Di-anilino symmetrical di-phenyl-thiourea
Diphenylamine
Phenyl-alpha-naphthylamine The amounts of the antioxidants and of the compounds disclosed by Walker which may be added to arrest the polymerization are illustrated in the above examples but since these products are also used for other purposes as disclosed above, the amounts of each which may be added are discussed more fully hereinafter. When either one or both agents are added to the polymer dispersion, preferably the agent or agents are first emulsified in water, for example, in the same aqueous medium in which the polymer is dispersed. Frequently, they are dissolved in benzene or other suitable solvents before emulsification. It is particularly convenient to use two or more reagents whose mixtures melt below ordinary temperature. Thus, a mixture of two antioxidants may be used, for example, 45 parts of diphenylamine and 55 parts of phenyl-alpha-naphthylamine give a liquid mixture which may be readily dispersed in an emulsifying solution without the use of solvent and may be used in place of the dispersion of a benzene solution of phenyl-beta-naphthylamine described above.

The coagulation of the latices may in general be brought about by addition of sodium chloride, in some cases with the additional use of an alcohol, as described in the copending application of Calcott and Youker. Many other procedures are available for this purpose, such as the use of other electrolytes and particularly coagulation by exposure of the latex in thin films to low temperatures, as described in the copending application of Calcott and Starkweather, Serial No. 107,332, filed October 24, 1936. In fact, the latices described above are even more suitable for this purpose than those prepared according to the patent applications of Starkweather and Collins already referred to, since the former yield films which are stronger, more rigid, and freer from tack and hence are more easily carried through the washing and drying operations.

Although in certain cases there may be some reason for allowing the emulsifying agents to remain in the polymer after coagulation, it is generally preferable to remove substantially all of them before the final milling. This may be accomplished in any desired manner, for example, by washing the polymer in large masses with warm water on corrugated rolls or in thin films of the polymer with sprays of water, assisting the extraction, if it is desirable, by using a solvent which dissolves the emulsifying agent but not the polymer such as alcohol, acetone, etc. Milling may bring about a sufficient drying of the polymer but where this is not deemed satisfactory the polymer may be additionally dried, for example, by passing it in contact with a current of warm air. Milling on a rubber mill also assists in removing volatile material from the polymer but other means for effecting its removal are often resorted to, for example, as is disclosed in the copending application of Calcott and Starkweather, Serial No. 107,332, filed October 24, 1936, and referred to above, for example, washing the polymer in thin films with solvents.

The above description sets forth, both in general and in some detail, the preparation of polymers to be plasticized according to the present invention. It will be understood, however, that the additional details set forth in the copending application of Collins, Serial No. 204,305, filed April 26, 1938, which describes emulsion polymerization of chloroprene in the presence of sulfur, are incorporated in the present application by reference, so that this application is not strictly limited to the above described method for preparing polymers to be plasticized.

The method of carrying out the invention may also be further varied, as disclosed above, by starting with a polymer prepared in the massive state, for instance according to Example 1 of U. S. Patent 1,950,439. It may also be varied by using other compounds of the above general formula in place of tetramethyl thiuram disulfide, by varying the proportion of the compound of the general formula and the conditions under which it is used, and by the presence of certain auxiliary plasticizing agents. These variations are illustrated in the following examples and in the discussion which follows:

*Example 12*

An elastic polymer of chloroprene was prepared in 90% yield according to U. S. Patent No. 1,950,439 by allowing chloroprene containing 1% of dissolved sulfur to polymerize spontaneously by standing at room temperature for 10 days in small, thin walled glass bottles to provide for the ready dissipation of the heat of reaction. One per cent of phenyl-beta-naphthylamine and 1% of tetramethyl thiuram disulfide were incorporated into this elastic product while it was passed repeatedly through a rubber mill. Plasticization began almost at once. After milling for 10 minutes, the product had a plasticity number of 142 and a recovery of 27. Incorporating 1% of magnesium oxide reduced these figures to 125 and 14. On repeating the procedure except that no disulfide nor magnesium oxide were used, the plasticity number was 237 and the recovery was 262.

Example 13

A polymer of plasticity number 87 was obtained by following the procedure used in Example 12 but stopping the polymerization when one-half the chloroprene had been consumed and removing the unchanged chloroprene by extraction with alcohol. When this polymer was milled with one per cent each of tetramethyl thiuram disulfide, phenyl-beta-naphthylamine, and magnesium oxide, the plasticity number was reduced to 30.

Example 14

Benzothiazyl disulfide

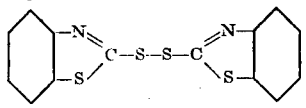

substituted for the tetramethyl thiuram disulfide aded to the latex and to the coagulated polymer in Example 1, gave a product of substantially the same plasticity with the advantage of greater tensile strength (3450 instead of 2700 lbs.) when compared at the longer curing time of 30 minutes.

Example 15

Dipenta-methylene thiuram tetra-sulfide, $C_5H_{10}$=N—C(S)—$S_4$—C(S)—N=$C_5H_{10}$, similarly substituted in Example 9 resulted in a product of substantially the same plasticity as that made with tetramethyl thiuram disulfide.

Example 16

A latex was made as described in Example 6 except that one-half part of the sodium salts of the acids obtained by condensing naphthalene sulfonic acids with formaldehyde according to U. S. Patent No. 1,191,480 was used along with the sodium abietate as emulsifying agent. The latex was treated with a dispersion of one part of phenyl-beta-naphthylamine, neutralized with acetic acid, and coagulated in the form of a continuous sheet, as described in a copending application of Calcott and Starkweather, Serial No. 107,332, filed October 24, 1936, by freezing it in a thin layer on the surface of a rotating, internally cooled drum, allowing the thin layer to remain in contact with the freezing surface for a length of time such that, on removing the film from the drum and allowing the ice therein to melt, a continuous sheet of completely coagulated material remained. The sheet was then washed by passing it under sprays of water while supported on a moving belt and dried by passage through a chamber through which air heated to 80° C. was passing. The dried material was then treated on a rubber mill with 2% of dibenzoyl disulfide. It plasticized rapidly, giving a plasticity number of 129 with a recovery of 15. Bis-carbo-methoxyphenyl tetrasulfide and bis-thionaphthoyl disulfide gave similar results. Without the addition of disulfide, the plasticity number was 423.

Example 17

Latex made as described in Example 4, except that a less pure chloroprene was used, was treated with 1.5% of phenyl-beta-naphthylamine and 1.0% of octyl mercaptan instead of the reagents added in the example and was then coagulated, washed, and dried by the usual procedure, 0.5% more octyl mercaptan being added during the milling. The coagulum was observed to be much softer and more easily worked than when no mercaptan was present and the dried polymer had a plasticity number of 129 and a recovery of 15. Latex from the same lot worked up in exactly the same way except that no octyl mercaptan was added had a plasticity number of 290. Substitution of paranitrothiophenol, thiobetanaphthol, mercapto dimethylbenzothiazol, thiobenzoic acid and tetramethyl thiuram disulfide for the octyl mercaptan gave plasticity numbers and recoveries of 154–10, 162–76, 200–143, 175–111, and 196–115, respectively.

Example 18

Into dry unplasticized polymer, prepared as in Example 16 and containing phenyl-beta-naphthylamine but no plasticizing agent, was incorporated by milling 2% of potassium hexamethylene dithiocarbamate. A plastic product with a plasticity number of 110 and a recovery of 4 was obtained. Similar results were obtained with the hexamethyleneimine salt of this acid and with the piperidine (piperidinium) salt of pentamethylene dithiocarbamate.

Example 19

The product of Example 10 was heated for 2 days at 70° C. The plasticity and recovery numbers fell from 105–5 to 82–0.

Example 20

Into the product of Example 8, one part of magnesium oxide was incorporated by milling. The plasticity rapidly increased, the plasticity and recovery numbers falling from 142–16 to 105–6.

Example 21

Into a plastic polymer obtained as in Example 9, one part of thiobetanaphthol was incorporated by milling. The plasticity and recovery numbers fell from 134–15 to 89–2.

The plasticizing of the polymer is further illustrated by the following Examples 22 to 34 in Table II, in which unplasticized polymer prepared as in Example 16 in the form of thin sheets was treated on a rubber mill at 50° C. with 2% of tetramethyl thiuram disulfide and the indicated quantity of various amines.

The plasticizing effect of various compounds of the general formula R—S—$R_1$ on polymer to which an amine was also added is illustrated in Examples 35 to 44 in Table III. The polymer in this series was also prepared as in Example 16, except that, instead of phenyl-beta-naphthylamine, 1 part of the liquid mixture of diphenylamine and phenyl-alpha-naphthylamine dispersed in sodium abietate (see above) was used.

Table II

| Example No. | Compound added in addition to 2% tetramethyl thiuram disulfide (milled 10 min. on 50° C. mill) | Plasticity number and recovery |
|---|---|---|
| 22 | None | 180–82 |
| 23 | Ethylene diamine (0.50%) | 94– 1 |
| 24 | Oleyl amine (0.52%) | 100– 2 |
| 25 | Benzyl amine (0.50%) | 136–11 |
| 26 | Dibutyl amine (0.25%) | 108– 6 |
| 27 | Diethanol amine (0.20%) | 154–24 |
| 28 | Dicyclohexyl amine (0.35%) | 124– 7 |
| 29 | Dibenzyl amine (0.50%) | 137–21 |
| 30 | Piperidine (0.50%) | 85– 1 |
| 31 | Tributyl amine (0.36%) | 114– 2 |
| 32 | Dimethyl stearyl amine (0.58%) | 141–22 |
| 33 | Para phenylene diamine (0.50%) | 137–14 |
| 34 | Brucine (0.50%) | 142–27 |

Table III

| Example No. | Compound added (2%) in addition to 1% of dibutyl amine | Plasticity number and recovery |
|---|---|---|
| 35 | None | 231-64 |
| 36 | Diphenyl disulfide | 60- 2 |
| 37 | Bisalphathionaphthoyl disulfide | 111- 7 |
| 38 | Tetramethyl thiuram disulfide | 36- 3 |
| 39 | Dipentamethylene thiuram tetrasulfide | 56- 3 |
| 40 | Dibenzothiazyl disulfide | 67- 1 |
| 41 | Mercaptothiazol | 134-11 |
| 42 | Potassium hexamethylene dithiocarbamate | 101- 2 |
| 43 | Piperidinium pentamethylene dithiocarbamate | 98- 4 |
| 44 | Sodium dimethyl dithiocarbamate | 140-15 |

For many purposes, a polymer made with less sulfur is preferred, thus a polymer made with 0.5% sulfur instead of 0.75% has the advantage that it may be readily softened to the plasticity desired for most applications (plasticity numbers between about 80 and about 120) but that there is little danger of plasticizing it beyond this preferred range by milling too long or at too high a temperature and further, that the polymers thus obtained have somewhat better curing properties and tensile strength than those prepared from larger amounts of sulfur. Several examples of the plasticization of polymers of this type are given in Table IV. The polymer to be plasticized was prepared exactly like that used in Tables II and III except that only 0.5% of sulfur was used.

Table IV

| Example No. | Compounds added | Plasticity number and recovery |
|---|---|---|
| 45 | Tetramethyl thiuram disulfide (2%) / Dibutylamine (1%) | 106-8 |
| 46 | Tetramethyl thiuram disulfide (2%) / Diorthotolyl guanidine (2%) | 116-17 |
| 47 | Dibenzothiazyl disulfide (2%) / Dibutylamine (1%) | 100-5 |
| 48 | Dibenzothiazyl disulfide (2%) / Diorthotolyl guanidine (2%) | 102-4 |
| 49 | Bis-isopropylxanthogen (4%) / Diorthotolyl guanidine (1.5%) | 93-3 |
| 50 | Bis-ethylthioxanthogen (4%) / Diorthotolyl guanidine (1.5%) | 107-13 |

On the other hand, it is sometimes desirable to have an extremely plastic polymer which with suitable compounding may be used to make rubber articles by a process similar to casting rather than by the conventional technique of rubber manufacture. Such polymers may be made by polymerizing in the presence of larger quantities of sulfur and then plasticizing with larger amounts of plasticizing agents. An example of such a procedure is as follows.

Example 51

Chloroprene was polymerized as in Example 16 except that 1.5 parts of sulfur were used. The sulfur was incorporated by first dissolving it in 3 parts of a chlorinated naphthalene (sold under the name of Halowax 1001) at 125° C. and stirring this hot solution into the chloroprene at 40°. The latex was stabilized with antioxidant, neutralized, coagulated and reduced to the form of a dried sheet as already described for the polymer used in the examples of Tables II, III and IV. Four percent of tetramethyl-thiuram disulfide was then incorporated into the dry polymer by milling and the product was then ready for shipment or storage. The final plasticization was carried out by incorporating 2% of diorthotolyl guanidine by milling and allowing the product to stand for 24 hours. It rapidly became extremely plastic and very clearly showed its fluid properties by flowing under its own weight. The plasticity number was approximately 10.

The application of the present invention to a somewhat different type of chloroprene polymer prepared in the presence of sulfur dioxide is illustrated as follows.

Example 52

100 parts of chloroprene, in which 15 parts of sulfur dioxide, 0.24 part of sulfur and 2 parts of cyclohexanol had been dissolved, were dispersed at 10° in 212 parts of water containing 2 parts of the sulfated emulsifying agent described in Example 8 and 2 parts of the emulsifying agent made from naphthalene sulfonic acids described in Example 16 and polymerized at 42° until the density was approximately 1.084. A dispersion of 1 part of the liquid mixture of antioxidants used in Example 51, a dispersion of 1 part of tetramethyl-thiuram disulfide in the mixture of emulsifying agents used above and a solution of 1 part of dibutylamine in ethyl alcohol were then added to the latex which was then coagulated with salt. The polymer was washed with water on a corrugated mill and then dried by milling on a rubber mill in the presence of 1 part of phenyl-beta-naphthylamine and 1 part of tetramethyl-thiuram disulfide. The plasticity of the product was 94. Similar results were obtained by using 2 parts of diorthotolyl guanidine in the place of 1 part of dibutylamine but when neither of these alkaline reagents was added the plasticity was 180. With neither tetrametylthiuram disulfide nor the alkaline reagents, the product had practically no plasticity. Because of the presence of combined sulfur dioxide (approximately 6% in the polymer) it showed when compounded and cured a very small absorption of solvents such as kerosene even in comparison with the very good solvent resistance of the chloroprene polymers prepared according to the other examples.

The scope of the general formula is illustrated by the specific compounds:

Octyl mercaptan
Paranitro thiophenol
Thiobetanaphthol
Thiobenzoic acid
Mercaptobenzo thiazol
Mercaptodimethyl benzothiazol
Sodium dimethyl dithiocarbamate
Potassium hexamethylene dithiocarbamate
Hexamethyleneimine salt of hexamethylene dithiocarbamate
Piperidine salt of pentamethylene dithiocarbamate
Diphenyl disulfide
Dibenzoyl disulfide
Bisthionaphthoyl disulfide
Tetramethyl thiuram disulfide
Dipentamethylene thiuram disulfide
Dibenzothiazyl disulfide
Bis-carbomethoxyphenyl disulfide
Bis-ethylthioxanthogen
Bis-isopropylxanthogen given in the above examples. As shown in part by this list, the nature of the groups from which R and $R_1$ in the general formula may be selected is subject to great variation without exceeding the scope of the invention or producing compounds for which the process is inoperable. Thus, the alkyl groups may be straight chain or branched, primary, secondary, or tertiary, saturated or unsaturated, long or short and include hydro-aromatic groups, such as cyclohexyl. The aryl groups may be phenyl, tolyl, xylyl, benzyl, etc. Both the alkyl and aryl groups may contain, in addition to carbon and hydrogen, various radicals, such as nitro, chloro, and carbomethoxy as illustrated above.

The thiazyl group

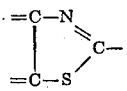

may have the two adjacent carbon atoms forming a part of an aromatic nucleus, which is subject to the same variation as the aryl group discussed above. In the thiocarbamyl group, RR'NC(=S)—, the xanthogenyl group RO—CS—, and the thioxanthogenyl group, RS—CS—, the radicals represented by R and R' may be either alkyl or aryl of the scope discussed above. Both together may be a divalent group such as penta- or hexamethylene. In the aromatic acyl and thioacyl groups, the aromatic portions are also subject to the same variation as already discussed. By "base-forming radical" is meant an element of the alkali or alkaline earth groups or an ammonium or substituted ammonium group, such as sodium, potassium, calcium, magnesium, ammonium, tetramethyl ammonium, piperidinium ((CH$_2$)$_5$NH$_2$—) and the like.

Although many of the compounds in the above list such as the polysulfides have symmetrical structures, this is only because such compounds are generally more easily prepared than the unsymmetrical ones represented by the general formula. Unsymmetrical compounds such as:

Phenyl ethyl disulfide
Phenyl naphthyl disulfide
Phenyl benzoyl disulfide
Benzoyl thiobenzoyl disulfide
Phenyl thiocarbamyl disulfide
Thiobenzoyl thiocarbamyl disulfide
Benzothiazyl benzoyl disulfide
Benzothiazyl thiocarbamyl disulfide
Dimethyl ethyl phenyl thiuram tetrasulfide obviously have properties similar to those of the corresponding symmetrical compounds and function similarly in the present invention. The free dithiocarbamic, xanthogenic and thioxanthogenic acids included in the general formula are in many cases unstable and are conveniently added in the form of their salts, as the mercaptans and thio acids may also be added. These salts are provided for in the general formula when R$_1$ is a base-forming radical. Still other agents described by the general formula may be formed in the presence of the polymer instead of being added as such. Thus, it has been found that when the chloroprene used in making the polymers contains a substantial amount of dichloro-1,3-butene-2, the addition of sodium sulfhydrate to the alkaline polymer latex followed by coagulation after several hours standing gave a soft coagulum similar to that obtained in Example 17 and giving a plastic polymer on drying. This effect is believed to be due to the formation of a chlorobutenyl mercaptan.

The greater the total proportion of the compound of the general formula present during the milling step, the more plastic is the final product. The quantity present in Examples 1 to 11 is usually sufficient in the case of tetramethyl thiuram disulfide but may advantageously be increased when the polymer is hard to plasticize or when less active compounds having the general formula are used. Thus, altho the quantity to be used depends greatly upon the reagent as well as upon the effect to be produced, preferred quantities are in general in the range from about 0.5 to about 6%. It will nevertheless be understood that the invention is not intended to be limited to this particular range of amounts, and that on the contrary the use of both greater and less amounts is within the scope of the invention. All percentages which are mentioned herein of agents added to the polymer or to the latex are by weight and are based on the weight of the polymer.

It will also be apparent from the above description that the compounds of the general formula may be added to the polymer in any desired manner and at a wide variety of stages of the process and that part may be added at one stage and part at another. In fact, where a compound of the general formula is added at an early stage of the process for convenience or for some effect it may have in addition to the principal one contemplated by the present invention, it is usually desirable to take into account the possibility that some of it may have been lost during processing so that the portion lost may be replaced if it reduces the amount present below the desired amount.

Polymers of chloroprene prepared in the presence of sulfur may be plasticized by a compound of the general formula in the absence of an antioxidant such as phenyl-beta-naphthylamine. It is generally desirable, however, to have such an antioxidant present during plasticization to retard or prevent oxidation then or later since oxidation tends to cause a decrease in plasticity among other things.

The preferred plasticizing agents, when one of the alkaline auxiliary agents discussed below is not used, are tetramethyl thiuram disulfide, benzothiazyl disulfide, and thio beta-naphthol, and the groups to which they below, i. e., the thiuram sulfides, the thiazyl sulfides, and the mercaptans. In the presence of alkaline auxiliary agents, the thiuram and thiazyl sulfides such as tetramethylthiuram disulfide and dibenzothiazyl disulfide are preferred.

Many of the compounds of the general formula have other desirable effects, in addition to their plasticizing action. Thus, many of them, particularly the thiuram disulfides, are effective in arresting polymerization of the chloroprene when added to the incompletely polymerized dispersions. The thiuram and thiazyl sulfides, among other groups, greatly reduce the tendency for the plasticized polymers to become less plastic on prolonged storage. Both these effects are discussed for certain plastic chloroprene polymers in copending applications of Walker, Serial Nos. 69,740 and 154,212, filed respectively, March 19, 1936, and July 17, 1937. The effects obtained with the polymers of the present invention in this connection are analogous to those obtained in the Walker cases with the polymers there described. A third additional effect of the compounds of the general formula is their effect upon curing properties. This may be either to retard the curing so that the highest tensile strength is obtained with longer curing times, as is generally the case with the mercaptans, or to accelerate the curing, as is the case with certain thiuram disulfides. Both effects are desirable. It is therefore often advantageous to use two or more different compounds of the general formula in order to produce other effects in addition to plasticization.

The present invention has been described thus far with particular reference to chloroprene but it is not so limited and is generally applicable to halogen-2-butadienes-1,3 including also such halogen-2-butadienes-1,3 as those in which the hydrogen atom on the third carbon atom of the butadiene group has been replaced by a hydrocarbon group. Thus, chloroprene in the above described invention may, for example, be replaced with bromo-2-butadiene-1,3 or with chloro-2-methyl-3-butadiene-1,3. Chloroprene has, of course, been selected as a basis for the description because the application of the invention to it is a definitely preferred embodiment.

The conditions described in Examples 1 to 11 for the treatment of the polymer with the compound of the general formula are usually sufficient to give a well plasticized product but may be further altered, particularly when a more plastic product is desired. To this end, it is often advantageous to allow the latex to stand, at normal or elevated temperatures, after the addition of the compound of the general formula but before coagulation or to age the coagulum before washing or milling. Increasing the mechanical work done upon the polymer by increasing the time or decreasing the temperature of milling generally also increases the plasticity. Thus, milling in the presence of water on corrugated uneven speed rolls causes the polymer to plasticize both more readily and more extensively. Particularly when more than 0.5% of sulfur has been used in the polymerization of the chloroprene and a sufficient quantity of tetramethyl thiuram disulfide or similar agent has been added, storage of the plasticized polymer preferably at a somewhat elevated temperature, as illustrated in Example 19 brings about a further progressive increase in plasticity. The same treatment reduced the plasticity numbers of the products of Examples 2 and 3 to 71 and 86, respectively. Thus, the ultimate plasticity of the polymers of the present process is materially affected by the aging, conditions of milling, or heating to which they are subjected. By proper selection it is possible to produce polymers having any of a wide variety of degrees of plasticity. It will be apparent, of course, that, since an increase in aging, heating and/or milling tends, generally, to increase the ultimate plasticity, a decrease in the aging, heating and/or milling will tend to decrease the ultimate plasticity. It should be noted, however, that prolonged heating, aging or in some cases even milling beyond a certain point, which varies in individual cases, increases the plasticity only slightly and may even cause a pronounced reduction in plasticity.

Incorporation of small quantities of reagents, such as alkaline inorganic compounds and particularly amines which give bases with dissociation constants greater than about $10^{-6}$, into polymers containing compounds of the formula R—S—$R_1$ (above identified), has a pronounced additional effect upon the plasticity of these polymers, as illustrated in Examples 20, 22 to 34, inclusive, and 36 to 52, inclusive. As a further illustration, the treatment with magnesium oxide described in Example 20 applied to the products of Examples 1, 5, 7, 10, and 11 reduced the plasticity numbers to 86, 96, 125, 48, and 90, respectively. In addition to the magnesium oxide used here, many other mildly alkaline substances, such as trisodium phosphate, sodium carbonate, sodium tetra-borate, cadmium oxide and barium carbonate, have a similar effect. The salts of magnesium and cadmium, such as the sulfates and chlorides are also useful for this purpose and exert an effect not only when incorporated into the plastic polymer but also when present in small amounts in the dispersion in which the chloroprene is polymerized according to the method of the Collins application cited above. Quaternary ammonium halides, such as cetyl trimethyl ammonium bromide, also have a pronounced plasticizing action in some cases.

One per cent of the inorganic compounds mentioned above for further plasticizing of the chloroprene polymer are generally preferred. Small proportions, for example, 0.1% and 0.5%, are effective, although to a lesser degree. Much larger proportions, although producing in general a greater initial plasticization, sometimes cause a decrease of plasticity on aging of the polymer. The invention is not intended to be limited to the particular proportions mentioned, however, so that the invention includes within its scope the use of both larger and smaller amounts.

By increasing the proportion of sulfur used in the polymerization of the chloroprene, still greater plasticization by the amines may be obtained. Thus, using 1 part of sulfur instead of 0.5 part in Example 26 gave a plasticity number of 63 instead of 108. The effect upon plasticity of an even larger proportion of sulfur is illustrated in Example 51. In addition to the amines listed in Table II above, ammonia, diethyl amine, cyclohexyl amine, hexamethyleneimine, and diphenyl guanidine have also been found effective. It will be noted that many of the amines which have a pronounced plasticizing action are included in the general formula $NR_1$, $R_2$, $R_3$, in which $R_1$, $R_2$ and $R_3$ are hydrogen, aliphatic and hydro-aromatic hydrocarbon radicals, two of which together may form a divalent group in which both valences are attached to the nitrogen. The condensation products of aldehydes with amines, many of which have been developed as accelerators for the vulcanization of natural rubber, in many cases function like the amines discussed above when incorporated into the chloroprene polymers prepared in the presence of sulfur and containing the compounds of the general formula R—S—$R_1$. Especially effective are (1) the condensation products of aniline and its homologues with acetaldehyde and the high aliphatic aldehydes and (2) the condensation products of aliphatic diamines with aromatic aldehydes. Examples of these groups are the condensation products of aniline with acetaldehyde, hexanal, and ethyl isopropyl acrolein, of hexamethylene diamine with benzaldehyde, and of ethylene diamine with salicyl aldehyde. Another group of compounds active in this way is represented by thio-carbanilide. Compounds which liberate amines under the conditions used for plasticizing the polymers may also be used. An example of this type of agent is trimethylamine oleate. Practically speaking, diaryl guanidines, such as diorthotolyl guanidine, are the preferred amines, since they are nonvolatile and therefore are not lost on the hot mill and do not give an odor. Amines which give bases with dissociation constants somewhat less than $10^{-6}$ ($10^{-7}$ or $10^{-8}$, for example) function to some extent. It is also interesting to note that the pH range of dilute aqueous solutions of the preferred amines is calculated to be the same (10–12) as for dilute aqueous solutions of the best inorganic agents, such as MgO and Na₂CO₃. Thus, so far as is known, all the alkaline materials which are effective in assisting the plasticizing of the polymer are such that when made up into a 0.01 molar solution in water they give a pH between about 10 and about 12.

The amines are preferably added to the dry polymer on the mill but may also be advantageously added to the latex before coagulation. Dried films (Example 16) may be plasticized by exposure to volatile amines or ammonia in the vapor phase. The preferred alkaline auxiliary agents are magnesium oxide and the amines, dibutylamine, piperidine and the diaryl guanidines. The latter for example diorthotolyl guanidine are particularly preferred for the reasons given above. The preferred quantities of the alkaline auxiliary agents to be employed are from about 0.2% to about 3% by weight based on the weight of the polymer but as in the case of the compounds of the general formula the quantities to be used depend greatly upon the reagent as well as upon the effect to be produced so that it should be understood that the invention is not intended to be limited to this particular range of amounts and that to the contrary the use of both greater and less amounts is within the scope of the invention.

The present invention includes within its scope also the use of a combination of methods or of plasticizing agents or of assistants or of all three. Combinations frequently are found to be advantageous. Thus, polymers plasticized as in Tables II and III may be further plasticized by heating (see Example 19) for 24 hours at 70° C. or by keeping them at ordinary temperature for a month. Longer heating at 70° C., however, sometimes makes them less plastic. Further variations include the use of two or more compounds of the general formula given first above, or two or more alkaline auxiliary agents or both, with or without any others of the above mentioned combinations.

The uses of the products produced according to the present invention are, in general, the same as those given for the plastic polymers produced by the process described in Starkweather and Collins application Serial No. 156,518, filed July 30, 1937. The products of the present invention, however, are new and have novel properties which result in their being particularly adapted for certain uses, altho, as a matter of fact, the novel properties of these products are such as to give them advantages for use generally. Moreover, since the present invention furnishes chloroprene polymers of a much greater range of plasticity than has hitherto been described, the use of such products are much more varied and include not only those described in the above-identified copending application (some of which are mentioned more particularly below) but also many new uses which result from the high degree of plasticity and fluidity which the product may have.

(1) Production of shaped articles by allowing the compounded polymer to flow into a mold and then curing by heat.
(2) Filling cavities, as in tree surgery, and cracks, such as expansion joints in concrete pavements.
(3) As a rubbery adhesive which can be applied without solvent, for example in making artificial suede, fur, etc. by impinging fibers upon an adhesive coating of the material and then curing. Another type of use of such a cement is in laying glass bricks and wooden blocks and in place of putty.
(4) For production of concentrated solutions. These have the same type of uses as rubber solutions but because of their higher solids content and for lower viscosity, the former are more economical, more effective, and easier to apply, and may be used in many places where rubber solutions are unsatisfactory.

When used for the purposes already described for chloroprene polymers of other types, the products of the present invention have the following advantages:

(1) The plasticity may be varied at the time of compounding, it may be varied over a wide range, and, for a polymer of given sulfur content and method of polymerization, the physical properties after curing are independent of the extent to which the polymer has been plasticized.
(2) The processing is easier, since the plasticity may be adjusted exactly to that required (for example, calendering and tubing, which require closely controlled plasticity) for the particular operation, and since the adhesion of the polymer to itself is much better than in the case of polymers previously described.
(3) Curing is faster and may be carried out at lower temperatures than in the case of previously described chloroprene polymers.
(4) The cured products have higher modulus, tensile strength and resilience, better resistance to oil, abrasion, and tearing, and lower hysteresis loss and heat build-up than corresponding stocks made from the previously described polymers.

As illustrative of the superior working properties of these materials, it is pointed out that they can very readily be applied in very thin films to cloth. Another example is the ease with which the surfaces of the polymer may be united with the application of only slight pressure, even after they have been kept for considerable time at ordinary temperatures. This latter property is for example of great importance in the building up of automobile tire casings and results from the fact that the polymer surface retains a moderate amount of tack even tho kept for considerable time at room temperature. On the other hand, the tackiness does not increase sufficiently at milling temperatures to cause the polymer to give trouble by sticking to the rubber mill. Another advantage of the polymer when prepared by the preferred method, that is by polymerizing in aqueous emulsion and particularly when the coagulated polymer is dried by exposing to warm air in thin sheets, is its freedom from any substantial odor.

As indicated above, the products of the invention may be compounded and utilized in any of the ways described or referred to in the Starkweather and Collins application last identified above for the polymers prepared according to that application. An important one of these is to use natural rubber, for example 25%, with the polymer, whereby products with valuable combinations of properties may be obtained.

It should be understood that the products of the present invention may be used in latex form. Thus, as already discussed, both the compounds of the general formula R—S—R₁ and the alkaline auxiliary agents may be added to the latices made according to the application of Collins, Serial No. 204,305, filed April 26, 1938, which are then sometimes warmed or allowed to stand, finally giving a dispersion of plasticized polymer. This may then be used, for example, as an adhesive. The very plastic products such as are made according to Example 51 are especially suitable for use in the latex form, for example for making artificial suede and fur.

As already stated, the products of the invention may be compounded and utilized in any of the ways described or referred to in the Starkweather and Collins application. An important one of these is to use natural rubber, for example 25%, with the polymer, whereby products with valuable combinations of properties may be obtained.

It is thus obvious that the compositions obtained by incorporating a compound of the general formula R—S—R₁ (explained above) into a non-plastic of chloroprene (or other halogen diene included within the scope of this invention) prepared by polymerizing the chloroprene (or other halogen diene) in the presence of sulfur are new and useful and have very desirable properties including in addition to those mentioned above the advantage that the compositions present fewer difficulties in shipping since they are tough and do not tend to run together into a mass, when several sheets are packed together, to nearly as great an extent as do plastic polymers generally. These polymer compositions may, however, be rendered plastic very readily when desired, according to the present invention, which also permits of their being plasticized to any of a wide variety of degrees.

It is apparent that many widely different embodiments of this invention may be made without departing from the spirit and scope thereof and therefore it is not intended to be limited except as indicated in the appended claims.

I claim:

1. In a process for making plastic, rubber-like materials by polymerizing chloro-2-butadiene-1,3 in the presence of sulfur and then plasticizing the polymerized material, the step of adding to the polymerized material at least one compound of the general formula R—S—R₁ in which R is a member of the group consisting of alkyl, aryl, thiazyl, thiocarbamyl, xanthogenyl, thioxanthogenyl, aromatic acyl and aromatic thioacyl radicals, and R₁ is a member of the group consisting of hydrogen, base-forming radicals, and radicals represented by —Sₙ—R₂ in which $n$ is a whole number less than 4 and R₂ is one of the group represented by R above.

2. In a process for making plastic, rubber-like materials by polymerizing chloro-2-butadiene-1,3 in the presence of sulfur and then plasticizing the polymerized material, the steps of adding to the polymerized material at least one compound of the general formula R—S—R₁ in which R is a member of the group consisting of alkyl, aryl, thiazyl, thiocarbamyl, xanthogenyl, thioxanthogenyl, aromatic acyl and aromatic thioacyl radicals and R₁ is a member of the group consisting of hydrogen, base-forming radicals, and radicals represented by —Sₙ—R₂ in which $n$ is a whole number less than 4 and R₂ is one of the group represented by R above, and adding an amine which gives a base with a dissociation constant greater than about $10^{-6}$.

3. In a process for making plastic, rubber-like materials by polymerizing chloro-2-butadiene-1,3 in aqueous emulsion in the presence of sulfur, coagulating the emulsion, and plasticizing the polymerized material, the step of adding to the polymerized material at least one compound of the general formula R—S—R₁ in which R is a member of the group consisting of alkyl, aryl, thiazyl, thiocarbamyl, xanthogenyl, thioxanthogenyl, aromatic acyl and aromatic thioacyl radicals, and R₁ is a member of the group consisting of hydrogen, base-forming radicals, and radicals represented by —Sₙ—R₂ in which $n$ is a whole number less than 4 and R₂ is one of the group represented by R above.

4. In a process for making plastic, rubber-like materials by polymerizing chloro-2-butadiene-1,3 in aqueous emulsion in the presence of sulfur, coagulating the emulsion, and plasticizing the polymerized material, the steps of adding to the polymerized material at least one compound of the general formula R—S—R₁ in which R is a member of the group consisting of alkyl, aryl, thiazyl, thiocarbamyl, xanthogenyl, thioxanthogenyl, aromatic acyl and aromatic thioacyl radicals and R₁ is a member of the group consisting of hydrogen, base-forming radicals, and radicals represented by —Sₙ—R₂ in which $n$ is a whole number less than 4 and R₂ is one of the group represented by R above, and adding an amine which gives a base with a dissociation constant greater than about $10^{-6}$.

5. A composition comprising a polymer of chloro-2-butadiene-1,3 having sulfur in chemical combination therewith and at least one uncombined compound of the general formula R—S—R₁ in which R is a member of the group consisting of alkyl, aryl, thiazyl, thiocarbamyl, xanthogenyl, thioxanthogenyl, aromatic acyl and aromatic thioacyl radicals, and R₁ is a member of the group consisting of hydrogen, base-forming radicals, and radicals represented by —Sₙ—R₂ in which $n$ is a whole number less than 4 and R₂ is one of the group represented by R above.

6. A composition comprising a polymer of chloro-2-butadiene-1,3 having sulfur in chemical combination therewith, at least one uncombined compound of the general formula R—S—R₁ in which R is a member of the group consisting of alkyl, aryl, thiazyl, thiocarbamyl, xanthogenyl, thioxanthogenyl, aromatic acyl and aromatic thioacyl radicals, and R₁ is a member of the group consisting of hydrogen, base-forming radicals, and radicals represented by —Sₙ—R₂ in which $n$ is a whole number less than 4 and R₂ is one of the group represented by R above, and an uncombined amine which gives a base with a dissociation constant greater than about $10^{-6}$.

7. In the process for making plastic, rubber-like materials by polymerizing chloro-2-butadiene-1,3 in the presence of sulfur and then plasticizing the polymerized material, the step of adding to the polymerized material a thiazyl sulfide.

8. In the process for making plastic, rubber-like materials by polymerizing chloro-2-butadiene-1,3 in the presence of sulfur and then plasticizing the polymerized material, the step of adding to the polymerized material benzothiazyl sulfide.

9. In the process for making plastic, rubber-like materials by polymerizing chloro-2-butadiene-1,3 in the presence of sulfur and then plasticizing the polymerized material, the step of adding to the polymerized material a mercaptan.

10. In the process for making plastic, rubber-like materials by polymerizing chloro-2-butadiene-1,3 in the presence of sulfur and then plasticizing the polymerized material, the step of adding to the polymerized material thio-beta-naphthol.

11. In the process for making plastic, rubber-like materials by polymerizing chloro-2-butadiene-1,3 in the presence of sulfur and then plasticizing the polymerized material, the step of adding to the polymerized material a thiuram disulfide.

12. In the process for making plastic, rubber-like materials by polymerizing chloro-2-butadiene-1,3 in the presence of sulfur and then plasticizing the polymerized material, the step of adding to the polymerized material a tetra alkyl thiuram disulfide.

13. In the process for making plastic, rubber-like materials by polymerizing chloro-2-butadiene-1,3 in the presence of sulfur and then plasticizing the polymerized material, the step of adding to the polymerized material a tetra alkyl thiuram disulfide and a diarylguanidine.

MORTIMER A. YOUKER.